United States Patent [19]

Beermann

[11] 4,179,635
[45] Dec. 18, 1979

[54] DEVICE FOR BRACING A STATOR WINDING DISPOSED IN THE AIR GAP OF A SYNCHRONOUS GENERATOR

[75] Inventor: Heinrich Beermann, Mülheim, Fed. Rep. of Germany

[73] Assignee: Kraftwerk Union Aktiengesellschaft, Mülheim, Fed. Rep. of Germany

[21] Appl. No.: 817,225

[22] Filed: Jul. 20, 1977

[30] Foreign Application Priority Data

Jul. 23, 1976 [DE] Fed. Rep. of Germany ....... 2633278

[51] Int. Cl.² .............................................. H02K 3/48
[52] U.S. Cl. .................................................... 310/214
[58] Field of Search ............... 310/179, 254, 214, 258, 310/215, 259, 65, 64, 85, 86, 58-60

[56] References Cited

U.S. PATENT DOCUMENTS

| | | | |
|---|---|---|---|
| 2,809,310 | 10/1957 | Dunn | 310/86 |
| 2,961,716 | 11/1960 | Luenberger | 310/86 |
| 3,158,770 | 11/1964 | Coggeshall | 310/214 |
| 3,243,622 | 3/1966 | Whittlesey | 310/214 |
| 3,330,977 | 7/1967 | Balke | 310/214 |
| 3,560,776 | 2/1971 | Kildishev | 310/214 |
| 3,949,255 | 4/1976 | Brown | 310/214 |
| 4,063,122 | 12/1977 | Kullmann | 310/64 |

Primary Examiner—R. Skudy
Attorney, Agent, or Firm—Herbert L. Lerner

[57] ABSTRACT

Device for bracing a stator winding disposed in the air gap of a synchronous generator and inserted into radially inwardly opening slots formed in a hollow cylindrical holding member of non-magnetic steel received in a central bore formed in a stator lamination stack and radially supported by an inner hollow cylinder formed of synthetic material, the holding member and the hollow cylinder being subdivided axially in accordance with the stator lamination stack for forming radial cooling slots, the improvement therein including the sections of the hollow cylinder being centered at the teeth disposed between the slots formed in the holding member and being flattened in vicinity of the individual winding slots, and including wedges of insulating material extending in axial direction of the generator in sections according to the axial subdivision and disposed between the hollow cylindrical sections and the radially inner winding bars of each slot.

3 Claims, 6 Drawing Figures

DEVICE FOR BRACING A STATOR WINDING DISPOSED IN THE AIR GAP OF A SYNCHRONOUS GENERATOR

The invention relates to a device for bracing a stator winding disposed in the air gap of a synchronous generator, and more particularly, such a device that is inserted into radially inwardly opening slots of a cylindrical holding member or body of nonmagnetic steel and radially supported by an inner hollow cylinder of synthetic material, the holding member and the hollow cylinder being axially subdivided in accordance with the stator lamination stack.

Such an air gap winding is known from the German Published Prosecuted Application DT-AS No. 2 165 678. If, with an air gap winding of this type, the winding bars become relatively wide, so that the tangential spacing between the bars is small, slot closing wedges of conventional type cannot be held any more by the teeth of the holding member or by corresponding spacers disposed between the bars. In addition, the construction may be such that the teeth of the holding member do not protrude or project beyond the radially inner edge of the bars, so that suitable support points for slot closing wedges are thus lacking altogether.

It is therefore an object of the invention to provide a device for securing and bracing an air gap winding of this type, which makes it possible to hold the winding bars in the position thereof under prestessing forces without experiencing detrimental effects from pulsating bar forces and consequent settling phenomena upon the bar insulation.

With the foregoing and other objects in view, there is provided, in accordance with the invention, a device for bracing a stator winding disposed in the air gap of a synchronous generator and inserted into radially inwardly opening slots formed in a hollow cylindrical holding member of nonmagnetic steel received in a central bore formed in a stator lamination stack and radially supported by an inner hollow cylinder formed of synthetic material, the holding member and the hollow cylinder being subdivided axially in accordance with the stator lamination stack for forming radial cooling slots. In accordance with the invention, the sections of the hollow cylinder are centered at the teeth disposed between the slots formed in the holding member and are flattened in vicinity of the individual winding slots, and wedges of insulating material are provided extending in axial direction of the generator in sections according to the axial subdivision and disposed between the hollow cylindrical sections and the radially inner winding bars of each slot.

In accordance with another feature of the invention, slot shims are disposed between the inner bar and the wedge associated therewith and are formed either of insulating strips or wave-shaped or corrugated leaf springs or both thereof, and firmly secured and braced bars are attained when the wedges are driven in, whereby pulsating bar forces are reliably controlled and settling phenomena can be reliably equalized.

In accordance with a further feature of the invention, the wedges have parallel flanks and are beveled in a wedge-shaped manner at an end thereof.

In accordance with an added feature of the invention, the sections of the hollow cylinder and the wedges are beveled in axial direction at mutually engaging surfaces thereof.

In accordance with a concomitant feature of the invention, when the teeth of the holding member or the spacers do not project beyond the radially inner edge of the radially inner winding bar, and the holding member has an inner peripheral surface in flush alignment with the radially inner edge of the radially inner winding bar, the wedges are disposed in axial slots formed in the sections of the hollow cylinder.

Other features which are considered as characteristic for the invention are set forth in the appended claims.

Although the invention is illustrated and described herein as embodied in a device for bracing a stator winding disposed in the air gap of a synchronous generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 6:
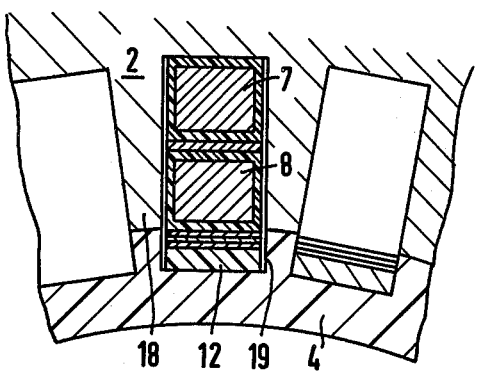
Figure 2:
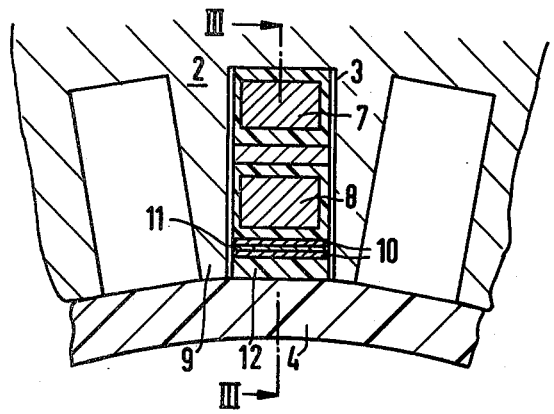
FIG. 2 is an enlarged fragmentary cross-sectional view of FIG. 1.
Figure 3:
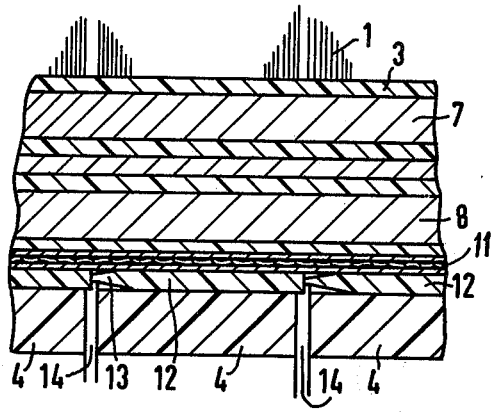
FIG. 3 is a fragmentary longitudinal sectional view of FIG. 2 taken along the line III—III in direction of the arrows and showing the stator of the generator in the vicinity of winding slots with corresponding wedges beveled at one end thereof.
Figure 4:
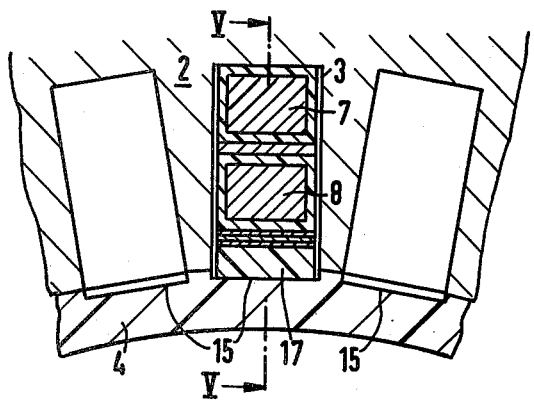
Figure 5:
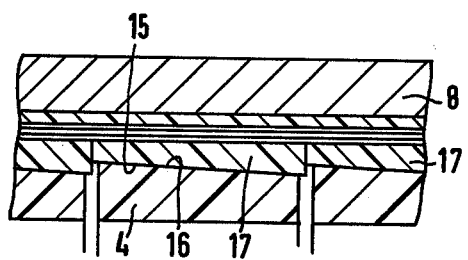

FIGS. 4 and 5 are views respectively corresponding to the cross-sectional and longitudinal sectional views of FIGS. 2 and 3 of another embodiment of the invention having wedges that are beveled at the surfaces thereof that are in contact with the hollow cylinder; and FIG. 6 is a fragmentary cross-sectional view corresponding to those of FIGS. 2 and 4 of a third embodiment of the invention having wedges disposed in slots of the hollow cylinder.

Figure 1:
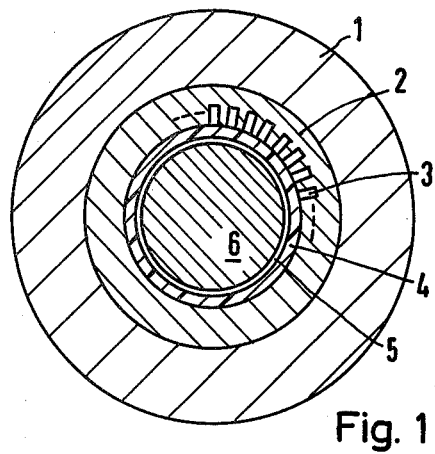
FIG. 1 is a cross-sectional view of a synchronous generator according to the invention with an air gap winding in the basic construction thereof.

Referring now to the drawing and first, particularly, to FIG. 1 thereof, there is shown a synchronous generator according to the invention basically formed of an outer stator lamination stack 1, in the central bore of which a hollow cylindrical holding member 2 of nonmagnetic material is received. This holding member 2 is formed with radially inwardly opening slots 3, disposed about the inner periphery thereof, into which an air gap winding is inserted. After the winding is put in place, an inner hollow cylinder 4 of synthetic material is additionally inserted therein, which braces the individual winding bars radially. The remaining air gap 5 between the cylinder 4 and the rotor 6 then needs to be only as large as is mechanically required for inserting the rotor shaft 6. Since the stator has radial cooling slots for cooling the lamination stack, the holding body 2 and the hollow cylinder 4 are also axially subdivided in a corresponding manner and thus constructed of individual sections.

The exact disposition of the winding and the manner or securing it are shown in FIGS. 2 to 6. As is apparent from FIG. 2, two winding bars 7 and 8 are disposed radially one adjacent the other in each slot 3 of the holding member 2. The sections of the hollow cylinder 4, which are inserted from the inside, are initially centered at the slot teeth 9 of the holding member 2 or at suitable spacers and are flattened in the vicinity of the individual winding slots 3. According to the invention, wedges 12 of insulating material, the shape of which is apparent from the longitudinal cross-sectional view according to FIG. 3, are then driven between the sections of the hollow cylinder 4 and the radially inner winding bar 8, after insulation shims 10 and conventional slot closing springs 11 formed of longitudinally corrugated or wave-shaped leaf springs have been inserted therebetween beforehand. These wedges 12 have parallel flanks and are beveled in wedge-shaped manner only at the tip 13 thereof, so that they can be driven more easily into the gap remaining between the slot shims 10 and springs 11, on the one hand, and the sections of the hollow cylinder 4, on the other hand. The wedging can then be carried out in sections in accordance with the axial subdivision of the sections of the hollow cylinder 4, for example, beginning in the center of the machine. The wedges 12 per se abut one another about the middle of the radial cooling slots 14 and therefore cannot wander axially. Only the end wedges on both sides are additionally secured.

Another possible embodiment of the wedges and the bracing thereof according to the invention are shown in FIGS. 4 and 5. The sections of the hollow cylinder 4 are axially beveled on the side 15 thereof facing the winding bars 8, while the wedges 17 are also beveled at the same angle at the corresponding flank 16 thereof. This makes it easier to drive these wedges 17 in and thereby provides a reliable fixation of the winding.

If, as in a third embodiment of the invention shown in FIG. 6, the teeth 18 of the holding member 2 do not project beyond the inner edge of the bars 8 but are flush with the latter, then the wedges 12 as well as the slot shims or inserts 10 and 11 can be inserted in corresponding slots 19 formed at the outer periphery of the sections of the hollow cylinder 4 and can be braced there. The wedges 12 per se can be formed in this embodiment of FIG. 6 similar to the wedges of the embodiments of FIGS. 3 and 5.

With the hereinafore described centering of the sections of the hollow cylinder and the wedging of the winding bars, there is attained, while supplying an appropriate prestressing force, a mounting or support of the winding bars which is easy to produce and simultaneously very stable, so that pulsating bar forces can cause no damage to the insulation or loosening of the bars in the slots.

There are claimed:

1. Device for bracing a stator winding disposed in the air gap of a synchronous generator and inserted into radially inwardly opening slots formed in a hollow cylindrical holding member of nonmagnetic steel received in a central bore formed in a stator lamination stack and radially supported by an inner hollow cylinder formed of synthetic material, the holding member and the hollow cylinder being subdivided axially and having radial cooling slots formed between the axial subdivisions thereof, the improvement therein which comprises the sections of the hollow cylinder being centered at the teeth disposed between the slots formed in the holding member and being flattened in vicinity of the individual winding slots, wedges of insulating material extending in axial direction of the generator in sections according to the axial subdivision and disposed between the hollow cylindrical sections and the radially inner winding bars of each slot, said wedges having parallel flanks and being beveled in a wedge-shaped manner at an end thereof, and slot shims interposing the uppermost bar and the wedge associated therewith, said slot shims being at least partly in the form of wave-shaped leaf springs and partly in the form of insulating strips.

2. Device according to claim 1 wherein the sections of the hollow cylinder and said wedges are beveled in axial direction at mutually engaging surfaces thereof.

3. Device according to claim 1 wherein the holding member has an inner peripheral surface in flush alignment with the radially inner edge of the radially inner winding bar, and said wedges being disposed in axial slots formed in the sections of the hollow cylinder.

* * * * *